Jan. 29, 1957 R. E. HENRICH 2,779,211
TUNED RUBBER CRANKSHAFT VIBRATION DAMPER
Filed Aug. 21, 1952
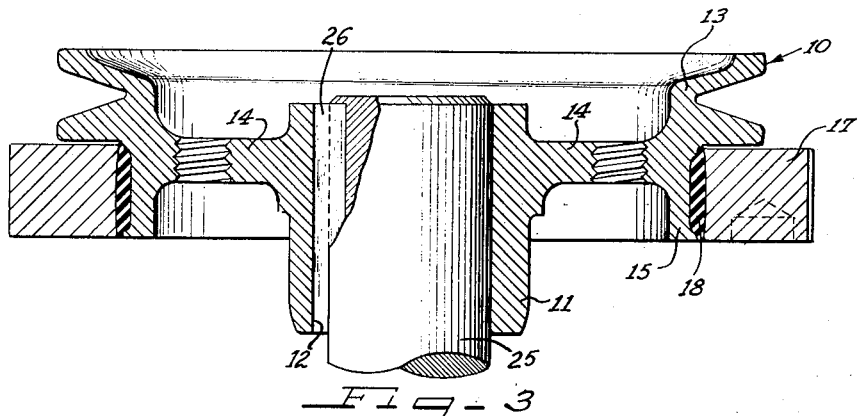
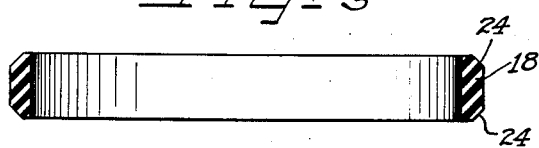
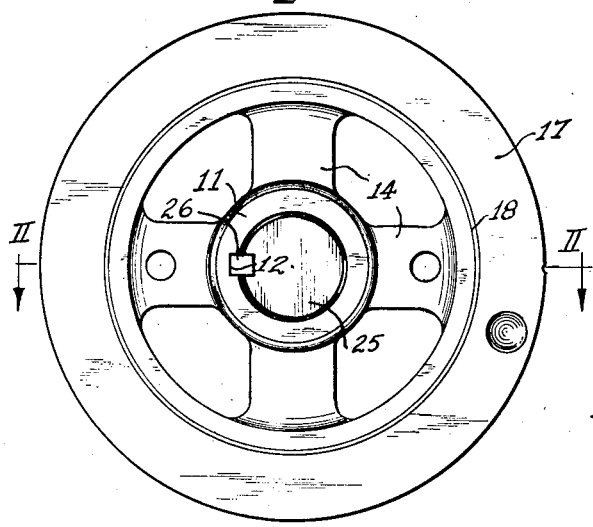
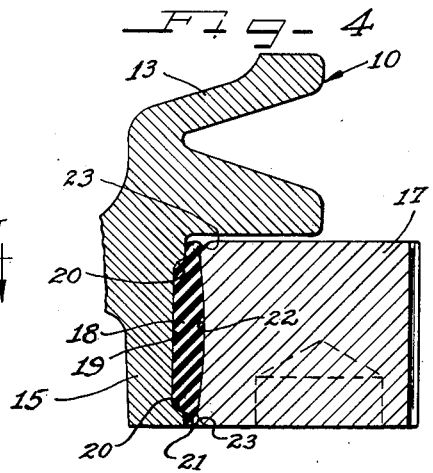
Inventor:
Richard E. Henrich
by Hill, Sherman, Meroni, Gross & Simpson
Attys

United States Patent Office 2,779,211
Patented Jan. 29, 1957

2,779,211

TUNED RUBBER CRANKSHAFT VIBRATION DAMPER

Richard E. Henrich, Snyder, N. Y., assignor to Houdaille Industries, Inc., a corporation of Michigan Application August 21, 1952, Serial No. 305,561

7 Claims. (Cl. 74—574)

The present invention relates to improvements in crankshaft vibration dampers and is more especially directed to improvements in the construction of vibration dampers adapted for use on the crankshaft of automobile or like internal combustion engines.

An important object of the present invention is to provide a low cost, simple and efficient vibration damper utilizing as a coupling between an inertia member of the flywheel type and a supporting member, a rubber spring adapted to be tuned to the torsional vibration damping requirements in the normal operating range of the mechanisms such as an internal combustion engine with which the damper may be used.

Another object of the invention is to provide a tuned rubber vibration damper in which an inertia ring or flywheel member is coupled without bonding or cementing to a supporting member subject to torsional vibrations of high torque values without slippage.

A further object of the invention is to provide a novel dynamic vibration absorber or damper including a tuned rubber coupling element, and having novel interconnecting structure between the rubber element and the associated parts of the assembly.

Still another object is to provide a novel combination pulley and hub unit with tuned vibration damping inertia ring in combination therewith, adapted for application to the end of the crankshaft of an internal combustion engine.

Other objects, features and advantages of the present invention will be readily apparent from the following detailed description of a preferred embodiment thereof taken in conjunction with the accompanying drawing in which:

Figure 1 is a side elevational view of a pulley and hub unit carrying a tuned vibration damper according to the present invention;

Figure 2 is an enlarged diametrical sectional view taken substantially on the line II—II of Figure 1;

Figure 3 is a diametrical sectional view through a rubber tuning spring ring as it appears prior to assembly in the combination; and Figure 4 is a fragmentary sectional view taken in substantially the same plane as Figure 2 and showing the structure at the right side thereof on an enlarged scale for better visualization of certain details of structure.

The present invention is especially useful in connection with a pulley and hub unit 10 of the kind which is adapted to be attached to the forward end of the crankshaft of an internal combustion engine in a vehicle such as an automobile or truck. The unit comprises a hub 11 which is axially bored for attachment to a crankshaft 25 and has a longitudinal internal key way 12 which receives a key 26 for keying the unit against relative rotation on the crankshaft but compelling fixed rotation of the hub 11 with the crankshaft. Preferably cast or forged integrally with the hub 11 is a grooved pulley wheel 13 concentric with the hub and connected thereto by means of spokes 14.

By preference, the pulley 13 is offset to one side of the median plane of the spokes 14 and an annular generally axially extending ledge flange 15 is provided to project from the opposite side of said median plane and defining a radial outwardly facing annular shoulder of smaller diameter than the perimetrical diameter of the pulley 13. This arrangement and construction is such as to provide support for an inertia ring or flywheel member 17 on the shoulder flange 15 through the medium of a rubber coupling spring ring element 18.

By the term "rubber" it will be understood that not only natural rubber but also synthetic rubber or plastic material having suitable elasticity and resiliency requirements are intended to be included.

The construction and relationship of the parts is such that the coupling attained by the rubber coupling ring 18 will withstand high torques between the inertia mass ring 17 and the pulley hub flange 15 without slippage, and further the inertia ring 17 is held against axial displacement. To this end, the rubber coupling ring 18 is constructed as a pre-moulded ring of substantially smaller diameter, but greater cross-sectional thickness, and substantially less width than in the final assembled relationship in the unit. In the assembly, the rubber coupling ring 18 is stretched to a substantially greater diameter about the flange 15, and is placed under substantial radial compression by the inertia ring 17. For example, in a typical commercial example the moulded inner diameter of the ring 18 was approximately 3.368 inches while the outer diameter of the ring was 3.666 inches. The width of the ring was .493 inch. In this commercial example the shoulder 15 had a principal diameter of approximately 4.350 inches to which the inside diameter of the ring 18 was stretched in assembly. The inside diameter of the inertia ring 17 was approximately 4.5 inches. The mass of rubber in the coupling ring 18 is such as to fill completely the space between the inside diameter of the inertia ring 17 and the shoulder flange 15.

In order to hold the inertia ring 17 against axial displacement, the rubber coupling ring engaging surfaces of both the supporting shoulder ledge 15 and the inertia ring 17 are contoured as shown in Figures 2 and 4. To this end, the shoulder ledge 15 is provided with an annular flat bottom channel 19, axially centered thereon and opening radially outwardly. The respectively opposite sides of the channel 19 are provided with transversely concavely contoured curbs or side walls 20 which merge on convex small radius shoulders 21 providing an ogee contour from the bottom of the channel to juncture with the maximum diameter portions of the ledge 15 at the opposite sides of and offset from the coupling groove 19. Such maximum diameter portions may be cylindrical, concentric with the cylindrical bottom of the groove 19 and providing annular bearing surfaces of substantial width.

The inner diameter surface of the inertia ring 17 is provided with a uniformly shallow transversely concave annular groove 22 which extends from side to side of the ring and merges at the side faces of the ring with respective small radius rounded corners or marginal ribs 23.

In assembling the components of the vibration damper, the rubber coupling ring 18 is stretched into position within the channel 19 of the ledge 15 in substantially centered relation. Then the inertia ring member 17 is pressed over the rubber coupling ring, and for this purpose the generally spherical contour of the channel 22 at the inside diameter of the inertia ring 17 is highly desirable.

The strong compression to which the rubber coupling 18 is subjected between the metal members of the assembly forces the rubber to flow uniformly throughout the space between the inertia ring and the shoulder ledge 15 so as to enter into uniform frictional engagement with all parts of the opposing surface of the ledge shoulder and the inertia ring.

It will be observed that the marginal portions of the inner diameter channeled face of the inertia ring 17 overlap the shoulders at each side of the channel 19 in the ledge shoulder 15 and that the margins of the rubber coupling ring 18 are under compression between the smallest diameter portions of the inner face of the inertia ring at the radius edges or ribs 23 and the annular offset bearing surfaces or shoulders at opposite sides of the ledge channel 19. Thereby rocking of the inertia ring about a transverse axis is strongly resiliently resisted by the compressed marginal portions of the coupling ring. Uniform lateral flow of the rubber in the coupling ring 18 is promoted by the radius contours 20 and 21. In order to accommodate the feathering at opposite margins of the compressed coupling ring 18, the ring as originally molded is preferably provided with beveled outer corners 24 as shown in Figure 3. This reduces the mass of rubber at the margins of the ring and provides the greater concentration of mass intermediately in the ring for compression between the opposing surfaces of the inertia ring and the supporting ledge.

In the final assembly, it will be noted that the inertia ring 17 is supported by the coupling ring 18 in uniformly concentric relation to the shoulder ledge 15 and in slightly spaced relation thereto at the corners 23 of the inertia ring. By reason of the channeled contouring of the opposing surfaces of the inertia ring and the carrying ledge 15, the areas of the opposing surfaces are substantially increased over what they would be if such opposing surfaces were cylindrical, and thereby substantially increased frictional resistance to slippage is afforded in relation to the width of the inertia ring 17. It will also be observed that the axial face of the inertia ring which opposes the pulley 13 is supported in substantial spaced relation thereto so as to avoid any frictional contact therewith.

Tuning of the damper is effected for particular requirements by selection of the mass of the inertia member 17 and by selection of the characteristics of the rubber utilized in the coupling ring 18, that is, the inertia of the flywheel ring member 17 and the stiffness or durometer of the rubber coupling ring 18 to the proper values. First, a value is selected for the inertia of the flywheel ring member 17. Since the effectiveness of the damper increases with the inertia of the flywheel ring member 17, the limiting factors on flywheel size are usually available space and material cost.

After the flywheel inertia is determined for any particular application, the required rubber stiffness is calculated so that the natural frequency of the damper will be about 70% of the undamped natural frequency of the member such as a crankshaft of an internal combustion engine to which the damper is to be applied. The rubber coupling ring 18 is provided with the proper stiffness or durometer value by selecting a rubber stock of a given modulus and calculating the required dimensions. The problem of obtaining proper tuning must take into account the fact that the ratio between static and dynamic moduli varies for different rubber stocks. Therefore, since it is the dynamic modulus which determines the tuning of the damper, final optimum tuning for a specific case usually must be determined experimentally. This accomplished by running performance tests on an engine of the kind for which a production run of the dampers is to be provided, with a number of dampers tuned to different values and selecting the damper having the optimum characteristics for mass production.

It will be understood that modifications and variations may be effected without departing from the scope of the novel concepts of the present invention.

I claim as my invention:

1. In combination in a crankshaft and vibration damper assembly, a crankshaft subject to torsional vibrations of known natural frequency, a hub member constructed for co-rotational attachment to the crankshaft and having thereon a concentric radially facing ledge of larger diameter than the crankshaft, an inertia ring of larger internal diameter than said ledge to an extent to leave a small radial concentric gap in assembly about the ledge, and a rubber coupling ring stretched from an internal diameter substantially smaller that said ledge to the diameter of said ledge and compressed from a radial thickness greater than said gap and in frictional coupling relation with the opposing surfaces of the ledge and the inertia ring and supporting the ledge and inertia ring in elastic concentric relation, said rubber coupling ring being of a predetermined dynamic modulus stiffness which tunes the damper to substantially the natural frequency of vibration of the crankshaft.

2. A crankshaft vibration damper comprising, in combination, a hub member for attachment to a crankshaft, said hub member having a concentric annular radially facing shoulder, an inertia ring member assembled about said shoulder and having an internal diameter slightly larger than the diameter of said shoulder, said shoulder and said inertia ring having respective opposing oppositely facing channels therein, a rubber coupling ring in tight frictional compression between the opposing surfaces within the respective channels and interlocking the inertia ring to the shoulder concentrically and against axial displacement, and means cooperatively engaging opposite marginal portions of the coupling ring therebetween under compression force strongly resisting rocking of the inertia ring about a transverse axis.

3. In combination in a crankshaft torsional vibration damper, a hub member having an annular radially facing ledge of substantial width, said ledge having a flat bottom channel throughout the major portion of its width defined by marginal cylindrical shoulders offset therefrom and merging on ogee contour with said bottom, an inertia ring member of substantial mass encircling said ledge and of substantially the same internal face width as said ledge but of substantially greater diameter to clear said ledge in concentric spaced relation, said internal face having a transversely concave contour defined by marginal ribs having convex radius contour and opposing said marginal shoulders of said hub ledge, and a rubber coupling ring stretched from a smaller diameter onto said ledge and compressed from a larger radial thickness to a smaller radial thickness between said ledge and said internal face and having the margins extending under compression between the opposing marginal shoulders on said ledge and the ribs on said internal face and thereby strongly resiliently resisting rocking of the ring member about a transverse axis, said coupling ring frictionally gripping the opposing surfaces within the ledge channel and within the concave contour of said internal face and retaining the inertia member in elastic tuned coupled relation to the hub.

4. A vibration damper according to claim 3 wherein said rubber coupling ring has the original cross-sectional mass relationship thereof substantially complementary to the assembled compression mass relationship and comprising a radial thickness substantially greater intermediately than the opposite marginal thicknesses thereof to compensate for the smaller mass requirements to fill the spaces between said opposing marginal shoulder and ribs as compared with the mass requirements to fill the spaces between the opposing surfaces of the ledge and said internal face intermediate said marginal shoulders and ribs.

5. A method of assembling a torsional vibration damper comprising a hub member having a radially facing should provided with a radially opening annular channel therein, an inertia ring of larger internal diameter than the shoulder and having a generally spherical internal face contour, and a rubber coupling ring of initial substantially smaller internal and external diameter than the shoulder but of greater radial thickness than the spaced relationship between the shoulder and the internal face of the inertia ring in concentric assembly, which comprises: stretching said rubber coupling ring to an internal diameter great enough to snap into said channel, and thereafter assembling the inertia ring about the shoulder and including compressing the rubber ring radially by means of said generally spherical internal surface into strong frictional gripping relation within said channel and against said internal surface to confine said coupling ring into an elastic coupling between said shoulder and said internal surface of the inertia ring.

6. In a crankshaft vibration damper, a hub member having an annular radially outwardly facing concentric ledge of substantial width thereon, an inertia ring having an internal minimum diameter slightly greater than the maximum diameter of said ledge, and a rubber coupling ring securing said ledge and said internal surface elastically in concentric relation, said ledge having marginal confining curbs projecting toward the internal surface of the inertia ring and merging with generally axially extending offset annular surfaces of substantial width, said internal surface of the inertia ring having marginal confining ribs projecting toward said annular surfaces in spaced relation and thereby cooperating with said curbs in locking said coupling ring against displacement and likewise locking the inertia ring against axial displacement from the ledge, said coupling ring having marginal portions strongly compressed between the respective opposing ribs and annular surfaces and thereby resisting rocking of the inertia ring about a transverse axis.

7. In a crankshaft vibration damper assembly including a hub member having an annular radially outwardly facing concentric ledge of substantial width thereon provided with an annular intermediate recess of a width to occupy the major area of the ledge but defined at opposite margins by offset generally axially extending ledge portions of appreciable axially extending surface areas, an inertia ring for closely encircling said ledge in spaced relation, and an elastic rubber coupling ring prefabricated to a smaller diameter than said ledge and of smaller width than said recess but of greater thickness than the maximum space between the inertia ring and the ledge, said ring as prefabricated having its outer corners beveled off to reduce the mass of rubber at the margins of the rubber ring, the rubber ring being stretched into said recess and compressed to a reduced thickness as well as a width substantially covering said ledge including said offset surface areas which are encompassed by the reduced mass margins of the rubber ring placed under strong compression against said offset surface areas by the opposing portions of the encircling inertia ring.

References Cited in the file of this patent

UNITED STATES PATENTS

| | | |
|---|---|---|
| 1,874,515 | Harris | Aug. 20, 1932 |
| 1,913,198 | Geyer | June 6, 1933 |
| 1,928,763 | Rosenberg | Oct. 3, 1933 |
| 1,940,885 | Rosenberg | Dec. 26, 1933 |
| 1,941,061 | Thiry | Dec. 26, 1933 |
| 2,049,133 | Peirce | July 28, 1936 |
| 2,116,254 | Welker | May 3, 1938 |
| 2,209,403 | Kittner | July 30, 1940 |
| 2,224,478 | Jones | Dec. 10, 1940 |
| 2,594,555 | Hardy | Apr. 29, 1952 |

FOREIGN PATENTS

| | | |
|---|---|---|
| 718,411 | France | Jan. 25, 1932 |
| 380,492 | Great Britain | Sept. 12, 1932 |
| 508,020 | Great Britain | June 22, 1939 |